United States Patent [19]

Job

[11] Patent Number: 4,948,770

[45] Date of Patent: Aug. 14, 1990

[54] METHOD FOR CRYSTALLIZING MAGNESIUM CHLORIDE AND METHOD FOR USING IN A CATALYST COMPOSITION

[75] Inventor: Robert C. Job, Houston, Tex.

[73] Assignee: Shell Oil Company, Houston, Tex.

[21] Appl. No.: 229,203

[22] Filed: Aug. 8, 1988

Related U.S. Application Data

[63] Continuation-in-part of Ser. No. 67,040, Jun. 29, 1987, abandoned.

[51] Int. Cl.$^5$ .............................................. C08F 4/64
[52] U.S. Cl. .................................. 502/107; 502/111; 502/113; 502/120; 502/125; 526/114; 526/115; 526/125
[58] Field of Search ............... 502/107, 111, 120, 121, 502/123, 124, 125, 126, 127, 113

[56] References Cited

U.S. PATENT DOCUMENTS

| | | | |
|---|---|---|---|
| 3,642,746 | 2/1972 | Kashiwa et al. | 260/88.2 |
| 4,111,835 | 9/1978 | Foschini et al. | 252/429 |
| 4,136,243 | 1/1979 | Appleyard et al. | 526/139 |
| 4,143,223 | 3/1979 | Toyota et al. | 526/125 |
| 4,220,745 | 9/1980 | Tanaka et al. | 526/125 |
| 4,238,354 | 12/1980 | Dietz | 252/429 |
| 4,276,193 | 6/1981 | Arlt et al. | 252/429 B |
| 4,308,170 | 12/1981 | Mizogami et al. | 252/429 |
| 4,311,817 | 1/1982 | Morita et al. | 526/124 |
| 4,329,253 | 5/1982 | Goodall et al. | 252/429 B |
| 4,330,649 | 5/1982 | Kioka et al. | 526/125 |
| 4,364,853 | 12/1982 | Mink et al. | 252/429 |
| 4,393,182 | 7/1983 | Goodall et al. | 526/125 |
| 4,400,302 | 8/1983 | Goodall et al. | 252/429 |
| 4,401,589 | 8/1983 | Kioka et al. | 252/429 B |
| 4,404,341 | 9/1983 | Ushida et al. | 526/125 |
| 4,414,132 | 11/1983 | Goodall et al. | 502/169 |
| 4,465,783 | 8/1984 | McKenzie | 502/105 |
| 4,467,044 | 8/1984 | Band | 502/111 |
| 4,525,555 | 6/1985 | Tajima et al. | 526/125 |
| 4,526,882 | 7/1985 | Johnson et al. | 502/105 |
| 4,535,068 | 8/1985 | Job | 502/107 |
| 4,540,679 | 9/1985 | Arzoumanidis et al. | 502/111 |
| 4,613,581 | 9/1986 | Maruyama et al. | 502/127 |
| 4,639,430 | 1/1987 | Pasquet et al. | 502/120 |
| 4,668,650 | 5/1987 | Lo et al. | 502/111 |

FOREIGN PATENT DOCUMENTS

| | | |
|---|---|---|
| 51-057789 | 11/1974 | Japan . |
| 54-093088 | 7/1979 | Japan . |
| 59-172507 | 3/1983 | Japan . |
| 59-206409 | 5/1983 | Japan . |
| 60-026007 | 7/1983 | Japan . |
| 59-187043 | 10/1984 | Japan . |
| 1486194 | 12/1973 | United Kingdom . |
| 2028347 | 8/1979 | United Kingdom . |
| 1554340 | 10/1979 | United Kingdom . |
| 2047718 | 3/1980 | United Kingdom . |
| 2101610 | 7/1981 | United Kingdom . |

*Primary Examiner*—Patrick P. Garvin

[57] ABSTRACT

Disclosed is a method for making crystalline magnesium halide particles usable for preparing catalyst and usable in the polymerization of alpha olefins having the formula MgnEmXp * y ROH wherein y is a value greater than 0 and up to 12, and which comprises the steps of:

contacting the components of a magnesium compound of the formula MgnEmXp, wherein Mg is the magnesium component, n is a value from 0.25 to 6, E is a metal, m is either 0 or 1, X is a halogen, and p is a value between 2n and (a*m+2n) (wherein a is the valence of the metal E) with an alcohol of the formula ROH, therein forming a solution;

heating the solution to a temperature to a temperature at about the boiling point of the alcohol and maintaining the solution at a temperature sufficient to allow for the azeotroping of any water present;

contacting the heated solution with a volume of an inert hydrocarbon liquid therein causing the formation of crystalline particles, and optionally melting the crystalline particles, and adding appropriate amounts of silica to the molten particles therein forming supported particles.

17 Claims, No Drawings

METHOD FOR CRYSTALLIZING MAGNESIUM CHLORIDE AND METHOD FOR USING IN A CATALYST COMPOSITION

This is a continuation-in-part of U.S. Application Ser. No. 067,040, filed June 29, 1987 and now abaondoned.

Field of the Invention

This invention relates to a process for preparing low melting crystalline magnesium halide alcohol complexes and a process for using those complexes in preparing solid olefin polymerization catalyst components having improved particle shape and size distribution. This invention rela:es to a procatalyst prepared from a particle having an improved shape within a narrow distribution of diameters and which is capable of producing polymer particles which mimic that improved shape and size distribution.

Background of the Invention

Magnesium halides of various degrees of purity are commercially available. These commercial compounds are prepared by known techniques which include but are not limited to precipitating the magnesium out of a solution containing both magnesium and a halogen, heating the resulting solid to remove all but traces of solvent.

The present invention relates to the preparation of crystalline magnesium halide complexes, particularly magnesium chloride complexes, which are more pure than the commercially available precipitates. The present invention also relates to a method for using these pure crystalline complexes ior the preparation of a catalyst component having unique and unusual morphological properties, useful in olefin polymerization. The invention also relates to catalyst systems subsequently prepared from these types of catalyst components which can comprise magnesium, titanium and chlorine with an activating organoaluminum compound. These subsequently prepared catalysts are often referred to as "supported coordination catalysts" or "catalyst systems".

Supported coordination catalysts of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymers. However, further improvements in productivity at high stereoregularity are still being sought.

The objective of scientists in this art is to provide catalyst systems which exhibit sufficiently high activity to permit the production of polyolefins in a high yield and without the need for extracting residual catalyst components in a deashing step. In the case of propylene and higher alpha olefins, an equally important objective in this art is to provide catalyst systems of sufficiently high selectivity toward isotactic or otherwise stereoregular products to obviate the necessity of extracting atactic polymer components from the system.

Although many chemical combinations provide active catalyst systems, practical considerations have led the scientists in the art to concentrate on certain preferred components. For convenience of reference, the following terms will be used ior the catalyst components: the solid titanium-containing catalyst component will be referred to herein as the "procatalyst". The catalyst component containing the organoaluminum compound, whether used separately, or partially or totally complexed with an electron donor, will be referred to herein as the "cocatalyst". The catalyst component containing the electron donor compound, whether used separately, or partially or totally complexed with the organoaluminum compound, will be referred to herein, as the "selectivity control agent" (SCA). The procatalysts typically comprise magnesium chloride, titanium chloride, generally in tetravalent form. The electron donor typically is an aromatic ester such as ethyl benzoate or ethyl p-toluate. The cocatalyst typically is an aluminum trialkyl such as aluminum triethyl or aluminum tri-isobutyl. Often the cocatalyst is at least partially complexed with a selectivity control agent ior use in the catalyst system. The selectivity control agent typically is an aromatic ester such as ethyl paramethoxy-benzoate(ethyl anisate) or methyl p-toluate.

While the selection of cocatalyst and selectivity control agent affects the performance of the resultant catalyst system, the component which appears to most significantly impact the system with respect to activity and productivity of the system is the procatalyst.

Preferred methods of preparing procatalysts are claimed in U.S. Pat. Nos. 4,329,253; 4,393,182; 4,400,302; and 4,414,132. These procatalysts are highly active and stereospecific. The typical manner of preparing such procatalysts involves the reaction of the magnesium compound, titanium tetrachloride and electron donor in the presence of a halohydrocarbon. The resulting solid particles are then contacted with additional quantities of $TiCl_4$ and the preparations are completed by washing off excess $TiCl_4$ using light hydrocarbons (e.g., isooctane and isopentane) and drying.

The procatalysts described above have excellent polymerization activity (polymer yield) and stereospecific performance (isotactic content). However, for some applications the particle morphology is not ideal. In olefin polymerization, polymer morphology is known to be a replica of catalyst morphology. Still further, the procatalyst morphology can depend on the morphology of the starting magnesium compound. For example, if the optimal catalyst morphology is spherical, then it is desirable to use starting materials, magnesium compounds, having a spherical morphology.

A number of different approaches to improved morphology are suggested in the patent literature. One approach, disclosed in British Pat. No. 2,101,610, involves reacting a solid particulate material with an organic magnesium compound then treating the supported magnesium composition with oxygen, carbon dioxide or a hydroxyl compound, then reacting the treated product with carbonyl compound and simultaneously or subsequently reacting the resultant product with a transition metal compound. Another approach for improved morphology, disclosed in U.S. Pat. No. 4,465,783 involves spray drying of a transition metal composition, or a support for a transition metal compound, while suspended in a liquid medium. Still another method is disclosed in West German patent No., DE 2,839,188 wherein solid magnesium dialkoxide particles are dispersed into a suitable liquid phase, followed by spray drying. However, the process of the 188 patent is not attractive in commercial applications as the dispersed solid particles tend to clog the fine orifices of the spray-drying equipment as well as clog and foul the pumping and metering systems. In another patent, U.S. Pat. No. 4,540,679 a magnesium hydrocarbyl carbonate support is used. In the '679 patent, a suspension of magnesium alcoholate with carbon dioxide is reacted with a transition metal component to precipitate a "magnesium hydrocarbyl carbonate" support. The patentees use a number of techniques, including prepolymerization and the use of triethyl aluminum (TEA) to remove ethanol, to improve productivity. However, these techniques have drawbacks since prepolymerization is a required additional step and the addition of TEA adds ash to the subsequently produced polymer product.

A new approach has now been found which permits the preparation of procatalyst particles having not only excellent productivity and selectivity, but also possessing excellent morphology.

Catalysts comprising such procatalyst particles have high activity and selectivity when used in polymerizing olefins such as propylene. The catalysts are able to produce polymer which has the form of spheres. The shape of the polymer is limited only by the imperfections in the support used to prepare the procatalyst. Perfectly spherical polymer has significantly higher bulk density than polymer prepared with catalysts that are not perfectly spherical.

Brief Description of the Invention

This invention provides a method for making crystalline magnesium halide particles having the formula $Mg_nE_mX_p \cdot yROH$, wherein E is a metal, X is halogen, ROH is an alcohol preferably a linear aliphatic alcohol, more preferably ethanol, propanol, n-butanol, or n-dodecanol, n is a number from 0.25 to 6, m is 0 or 1, p is a number from 2n to (am+2n), where a is the valence of the metal E, and y is a positive number of up to 12, which method comprises contacting a magnesium compound of the formula $Mg_nE_mX_p$, wherein the various symbols are as defined herein, or precursor(s) thereof, with an alcohol of the formula ROH to form a solution thereof, heating the solution to remove any water present by azeotroping, and contacting the heated solution with an inert hydrocarbon liquid to precipitate crystalline particles.

The invention also provides a method of making supported particles which comprises the further steps of melting the resulting crystalline magnesium halide particles at a temperature of 80° C. to 200° C., and adding a porous support to the molten product to form supported magnesium halide particles.

The invention further provides a method for making a procatalyst component which comprises the still further steps of halogenating the supported particles with a first halide of tetravalent titanium and a first electron donor to form a halogenated product, contacting the halogenated product with a second halide of tetravalent titanium and a second electron donor to form a treated halogenated product, contacting the treated halogenated product with a third halide of tetravalent titanium and additional second electron donor at a temperature from 40° C. to 140° C., and washing the resulting treated product with an inert hydrocarbon liquid.

Still further the invention provides a method of preparing a catalyst system which comprises contacting a procatalyst prepared as just described with a cocatalyst comprising an organoaluminum compound in molar ratios which produce an atomic ratio of Al to Ti of from 1/1 to 150/1.

Yet further the invention provides a method preparing an olefin polymer which comprises the liquid pool polymerization of at least one alpha olefin having from 2 to 8 carbon atoms in the presence of hydrogen at a temperature of at least 60° C. in the presence of a catalyst prepared as described in the preceding paragraph.

As shown in the examples which follow, propylene polymers produced with a catalyst system prepared in accordance with the present invention have an extremely low level of fines (i.e., very little polymer smaller than 250μm in diameter). Accordingly, this catalyst system can be very useful in gas phase processes where fines are deleterious to the process. Further, it is possible to use the catalyst system to produce polymers having a uniformly optimized particle size i.e. a relatively narrow particle size distribution. Such polymers may also have a higher bulk density (above 0.38 g/cc) and a ratio of short diameter (sd) to long diameter (ld) between 0.7/1 to 1.0/1.

The catalyst system can be used in the preparation of homopolymers or copolymers of alpha olefins having 2 to 8 carbon atoms, and in particular for the polymerization of propylene.

The primary method of the present invention involves preparing a unique magnesium halide compound, preferably a magnesium chloride compound, which is essentially pure, by crystallization. In the general formula $Mg_nE_mX_p \cdot yROH$ for the magnesium halide compound, the metal E can be a transition group metal or other metal, for example, iron, chromium, cobalt, aluminum or calcium. The magnesium halide particles can be prepared from a starting material such as a commercial grade of magnesium chloride having the molecular formula $MgCl_2$. Anhydrous magnesium chloride available from Alfa Products can be used as starting material. A starting material of this type is actually a mixture of the compounds: magnesium chloride, magnesium oxide, magnesium chloro-oxide, and small amounts of hydrated magnesium chloride.

Detailed Description of the Invention

The present invention involves preparing a unique magnesium halide compound which is essentially pure, from a starting material such as a commercial grade of anhydrous magnesium chloride having the molecular formula $MgCl_2$. Anhydrous magnesium chloride available from Alfa Products is a usable starting material for the present invention. A starting material of this type is actually a mixture of the compounds: magnesium chloride, magnesium oxide, magnesium chloro-oxide and small amounts of hydrated magnesium chloride.

In the present invention, the crystallized magnesium compound is prepared by adding the anhydrous grade o: magnesium chloride to an alcohol. One of the linear alcohols ethanol, propanol, butanol, dodecanol or a similar alcohol can be used within the scope of the present invention.

Once the commercially available magnesium chloride is added to the alcohol, the components are stirred to form a solution which is then heated to remove any water present by azeotroping. Suitably the solution is brought to a boil in order to allow ior distillation of any water azeotrope that may be present. A:ter a portion of the alcohol has distilled away, an optionally preheated inert hydrocarbon, such as kerosene or an isooctane, can be added to the solution. The solution is then cooled. A pure crystalline magnesium halide alcohol complex will then precipitate from the cooling solution, in the form of crystals, in exact ratios. It has been found that the slower the solution is cooled, the larger in diameter the crystals become.

The resulting crystals can be used to form the supported particles useful for preparing procatalysts used to prepare catalysts which are in turn used for the polymerization of olefins.

To prepare the novel supported particles, the pure crystals of magnesium halide complex (prepared according to the method described above), are melted. Melting can occur at temperatures in the range of about 80° C. to about 200° C.; more preferably between about 100° C and about 150° C., and most preferably in the range of about 100° and about 120° C. to form the molten product.

Proportionate amounts of porous support, such as pure silica, are then added to the molten product. The amounts should be sufficient to completely fill the pores of the support particles, with the magnesium halide complex. The support particles and the molten magnesium halide complex are blended together (not solution blended) to provide a homogeneous distribution of magnesium halide within the sphere of the support. Silica particles with distinct pore volumes are preferred for use within the present invention. It has been found that particles which can support 0.5 to 2 g of $MgCl_2$/g silica are usable within the scope of the invention. The preferred pore volume of silica usable within the scope of this invention is 1.4 to 3.0 ml/gram of silica.

The supports, such as the silica supports, are solid particulate materials which are inert to the other components of the catalyst composition, and inert to the other active components of the reaction system. These supports materials can be inorganic materials such as oxides of silicon and aluminum, molecular sieves, or organic materials, such as polymers. Polymers, including but not limited to, polyethylene and polyester should be useable within the scope of the present invention. When the support materials are inorganic oxides, the supports are in the form of dry powders having an average particle size of between about 10 to 250 microns and preferably between about 50 to 150 microns. It is most preferred that these supports be porous and have a surface area at least 3 square meters per gram and preferably at least 50 square meters per gram. The inorganic oxides should be "dry", provided the term "dry" means free of adsorbed water. Drying of the oxide material can be carried out prior to adding the support to the molten product, by heating the support at a temperature of, for example, greater than 100° C for a period of time or by chemically treating. Both techniques are well known in the art. In the case of silica supports, drying is suitably carried out by heating in a stream of dry inert gas at 150° C. to 450° C., preferably 150° C. to 300° C., e.g. 150° C. or 300° C.

The supports are added to the molten product and then stirred. Typically the molten product is maintained at atmospheric pressure and at a temperature between about 100° C. and about 200° C. until the resulting particle appears dry. The desired temperature and pressure may be varied to being at different temperatures and pressures to achieve the same result. These alternative combinations can be readily determined by one skilled in the art.

Once these supported particles of the magnesium halide complex have, preferably completely been obtained, it is necessary to convert the magnesium halide complex to a magnesium halide by one or more metathesis reactions (digestions), such as by the procedure that is disclosed in U.S. Pat. No. 4,414,132, to provide a procatalyst.

The first step in preparing procatalysts usable in olefin polymerization involves halogenating the supported particle (hereinafter referred to as having the formula MgX*silica where Mg is the magnesium component, X is a halogen, and "silica" represents an essentially anhydrous form of silica), with a halide of tetravalent titanium in the presence of a halohydrocarbon, and one or more electron donors, preferably to form a halogenated product.

It is most preferred to react the supported particles to provide a fully halogenated reaction product, i.e., a magnesium-dihalide. Such halogenation reactions are suitably effected by employing a molar ratio of magnesium compound to titanium compound of 0.005:1 to 2:1, preferably 0.01:1 to 1:1. These halogenation reactions are most preferably conducted in the presence of a halohydrocarbon and an electron donor, although the halohydrocarbon is optional. An inert hydrocarbon diluent or solvent may also be present. It may be possible to use a partially halogenated magnesium particle within the scope of the present invention.

Suitable halides of tetravalent titanium include aryloxy- or alkoxy-di- and trihalides, such as dihexanoxy-titanium dichloride, diethoxy-titanium dibromide, isopropoxy-titanium tri-iodide and phenoxytitanium trichloride. Titanium tetrahalides are preferred, and titanium tetrachloride is the most preferred halide for use in this invention. These halides of tetravalent titanium can be used as such, i.e. as the neat substance, or as concentrated solutions in a solvent, preferably inert, such as a hydrocarbon or halohydrocarbon.

Suitable electron donors which are used in the preparation of the solid procatalyst component of the present invention are ethers, esters, ketones, phenols, amines, amides, imines, nitriles, phosphines, phosphites, stibines, arsines, phosphoramides and alcoholates. Other examples of suitable donors usable in this invention are those referred to in U.S. Pat. No. 4,136,243 or its equivalent British Specification No. 1,486,194 and in British Specification No. 1,554,340 or its equivalent German Offenlegungsschrift No. 2,729,126. Preferred donors include esters, diesters and diamines, particularly esters and diesters of carboxylic acids, preferably aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, isobutyl phthalate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylenediamine, and also 1,2,4-trimethylpiperazine, 2,3,4,5-tetraethylpiperidine and similar compounds. The electron donors may be used singly or in combination. Most preferred electron donors for use in preparing the solid procatalyst component are ethyl benzoate and isobutyl phthalate.

In the text of this patent, electron donors used in the novel methods, will be distinguishable from each other as being "primary electron donors" or "secondary electron donors". The phrase "primary electron donor" means the electron donor that has the largest mol percent of all electron donors present in the final procatalyst. The phrase "secondary electron donor" means the electron donor that has the second largest mole percent of all electron donors present in the final procatalyst.

The halogenation step normally proceeds until formation of a solid reaction product which can be isolated from the liquid reaction medium by filtration, decantation or any other suitable method. The reaction product may be subsequently washed with an inert hydrocarbon diluent, such as n-hexane, iso-octane, or toluene, to remove unreacted material, which can include physically absorbed halohydrocarbon.

Suitable halohydrocarbons usable in this invention include compounds such as butyl chloride and amyl chloride. Preferred aliphatic halohydrocarbons are halogen-substituted hydrocarbons with 1 to 12 carbon atoms per molecule and, preferably less than 9 carbon atoms per molecule, and which comprise least two halogen atoms, such as dibromomethane, trichloromethane, carbon tetrachloride, 1,2-dichloroethane, dichlorobutane, 1,1,2-trichloroethane, trichlorocyclohexane, dichlorofluoroethane, trichloropropane, trichlorofluorooctane, dibromodifluorodecane, hexachloroethane, and tetrachloroisooctane. Carbon tetrachloride and 1,1,2-trichloroethane are preferred aliphatic halohydrocarbons. Aromatic halohydrocarbons may also be employed such as, chlorobenzene, bromobenzene, dichlorobenzene, dichlorodibromobenzene, naphthyl chloride, chlorotoluene, and dichlorotoluenes. Dichlorobenzene and to a greater extent, chlorobenzene are the preferred aromatic halohydrocarbons.

Subsequent to halogenation, the halogenated product is contacted with a halide of a tetravalent titanium, such as a dialkoxy-titanium dihalide, alkoxy- titanium trihalide, phenoxy-titanium trihalide or titanium ietrahalide. The most preferred titanium compounds include the titanium tetrahalides, and in particular, titanium tetrachloride. This contracting treatment increases the content of tetravalent titanium in the resultant solid procatalyst component. This increase in content should be sufficient to achieve a final atomic ratio of tetravalent titanium to magnesium in the resultant solid catalyst component of from about 0.005/1 to about 1.0/1, and particularly of from about 0.02/1 to about 0.2/1. Contacting the halogenated product with the tetravalent titanium halide is most suitably carried out at a temperature of from 40° to 140° C. for 0.1 to 6 hours, and optionally, in the presence of an inert hydrocarbon or halohydrocarbon diluent. Preferred contacting temperatures are between 70° and 120° C., and the most preferred contacting period is 0.5 to 3.5 hours. This treatment may be carried out in successive contacts of solid with separate portions of tetravalent titanium halide as described above, (such as TiCl4) optionally, in the presence of a halohydrocarbon which may contain suitable electron donors chosen from those previously listed.

The preferred halogen atom, possibly contained in the magnesium compound to be halogenated, and contained in the titanium compound which serves as halogenating agent and in the tetravalent titanium halide with which the halogenated product is contacted, is chlorine.

One aspect of the present invention involves treating the halogenated product with a particular second electron donor, subsequent to, or concurrent with, the treatment of the magnesium compound with the initial tetravalent titanium halide to enhance the selectivity of the catalyst and yield of the resultant polymers.

The treated procatalyst component can be isolated from the liquid reaction medium by washing to remove unreacted titanium compound from the reaction product. The titanium content of the final, washed catalyst constituent is preferably 1.5 to 3.6 percent by weight but can be up to 4.5 percent by weight.

The material used to wash the procatalyst component is preferably an inert, light hydrocarbon liquid. Preferred light hydrocarbon liquids and aliphatic, alicyclic or aromatic hydrocarbons. Specific examples include iso-pentane, n-hexane, iso-octane and toluene with isapentane being the most preferred.

The amount of light hydrocarbon liquid employed can be between about 5 to about 100 cc/gm of procatalyst in each of 2 to 6 separate washes. Preferably, about 25 cc/gm of liquid to procatalyst is used.

The resulting washed solid component is the procatalyst, which can be used with a cocatalyst and a selectivity control agent in the polymerization of olefins.

The organoaluminum compound to be employed as cocatalyst may be chosen from any of the known activators used in olefin polymerization catalyst systems which comprise a titanium halide. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Suitable electron donors, which are used in combination with or reacted with an organoaluminum compound, as the selectivity control agents, (SCA), and which can be used in the preparation of the solid procatalyst component are ethers, esters, ketones, phenols, amines, amides, imines, nitriles, phosphines, silanes, phosphites, stibines, arsines, phosphoramides and alcoholates. Examples of suitable donors are those mentioned earlier herein. Preferred electron donors are esters and organic silicon compounds. Preierred esters are esters oi carboxcylic acids, aromatic carboxylic acids, such as ethyl and methyl benzoate, p-methoxy ethyl benzoate, p-ethoxy methyl benzoate, p-ethoxy ethyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, and propyl pivalate. Examples of the organic silicon compounds useful herein include alkoxysilanes and aryloxysilanes of the general formula $R^1{}_nSi(OR^2)_{4-n}$ where n is between zero and three, $R^1$ is a hydrocarbon group or a halogen atom and $R^2$ is a hydrocarbon group. Specific examples include trimethylmethoxy silane, triphenylethoxy silane, dimethyldimethoxy silane, and phenyltrimethoxy silane. The electron donor used as selectivity control agent in the catalyst may be the same as or different from the donor used in preparing the titanium-containing procatalyst.

Most preferred first and second electron donors for use in preparing the titanium procatalyst are dimethyl napthalene as the initial electron donor and diisobutyl phthalate, or ethyl benzoate as the second electron donor; or diisobutyl phthalate as the initial electron donor and ethyl benzoate as the second donor. Most preferred selectivity control agents for use in the total catalyst are p-ethoxy ethyl benzoate, phenethyltrimethoxy silane and diphenyldimethoxy silane.

Preferred proportions of selectivity control agent employed separately, in combination with, or reacted with an organoaluminum compound, calculated as mol per mol aluminum compound, are in the range from about 0.005 to about 1.5, particularly from about 0.05 to about 0.5. Preferred portions of selectivity control agent, calculated as mol per mol Ti, are in the range of about 0.1 to about 50, particularly about 0.5 to about 20.

Proportions of primary electron donor contained in the solid catalyst component, calculated as mol per mol o! titanium, are suitably in the range of from about 0.01 to about 10, more preferably from about 0.05 to about 5 and most preferably from about 0.5 to about 3.

Proportions of secondary electron donor contained in the solid procatalyst component, calculated as mol per mol of titanium, are suitably in the range of from about 0.01 to about 2, and most preferably from about 0.05 to about 0.5.

Procatalyst, cocatalyst and selectivity control agent, if used separately, may be simply combined, and preferably, combined in molar ratios which produce in the final catalyst, an atomic ratio of aluminum (from cocatalyst) to titanium (from procatalyst) of from about 1/1 to about 150/1, and suitably from about 10/1 to about 150/1. In general, Al/Ti ratios in the range of about 30/1 to about 100/1 and more preferably from about 50/1 to about 80/1 will be found advantageous within the scope of the present invention.

The productivity of the procatalyst is determined as kilograms (Kg) of polymer per gram (g) of procatalyst in a standard one or two hour batch polymerization reaction. Productivity of the procatalys( may also be expressed as Kg polymer/g titanium (Ti). Catalyst activity is sometimes reported as Kg polymer/g procatalyst/hr.

The selectivity of the catalyst to isotactic polypropylene is determined by measuring the amount of xylene soluble polymer (XS), in accordance with regulations of the U.S. Food and Drug Administration (FDA). The XS test is carried out as follows:

The sample is completely dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the xylene solubles present in the filtrate are determined by evaporating a 10 ml aliquot of the filtrate, drying the residue under vacuum, and weighing the residue. The xylene-solubles consist of amorphous material with some low molecular weight crystalline material. (FDA regulations 121.2501 and 1.1.2510, 1971.)

The numerical value of XS in the case of propylene homopolymer is typically about 2 percent less than the XS amount of polymers extractable in refluxing n-heptane. Thus the isotacticity index of polypropylene (amount insoluble in refluxing n-heptane) is approximately 100 - (XS+2).

Specific details of the present invention follow. The following specific details are not intended to limit the invention to only those details.

Heat Treatment o: the Silica Support 20 g of porous silica spheres (5 to 50 micron in diameter) are placed in a 1 inch diameter quartz tube which is 18 inches long. Both ends of the tube are plugged with quartz wool and a gentle nitrogen flow is established through the :ube.

The part of the tube containing the silica spheres is placed in a tube furnace and the furnace is brought to drying temperature over a period of 45 minutes and then maintained a: that temperature for 15 to 20 hours. Drying temperatures used for the examples described below were either 150° C. or 300° C. or 450° C. The silica was cooled over a period of about 1 hour, under a flow of dried nitrogen and stored under dry nitrogen until use as a starting material for the present invention.

Preparation of the Crystalline Magnesium Chloride Alcohol Complexes

Example 1

Magnesium chloride (technical anhydrous, containing unspecified amounts of water) (205 g, ~2.0 moles) was placed in a 2-1,3-neck flask equipped with paddle stirrer and Friedrich's condenser. 1500 ml (16.4 mol) of 1-butanol wa added and the mixture heated under gentle reflux for 1.5 days while the magnesium chloride dissoived completely. 300 ml (3.3 mol) of the butanol was distilled off, at 112° C. (normal b.p. 117.7° C., water azeotrope b.p. ~92° C.), in an attempt to azeotrope off any water. The clear solution (Solution A) was treated with 300 ml of isooctane and the solution allowed to cool to room temperature, whereupon an apparently gelatinous (but actually crystalline and easily filterable) precipitate formed. The precipitate was collected (under an inert atmosphere) on a coarse fritted glass funnel, washed with isooctane, and then washed with isopentane. The precipitate was then dried under moving nitrogen. The yield was 348 g of transparent white crystalline powder, containing 5.65% Mg. A second quantity, (275 g) of precipitate was collected by distilling off another 300 ml of alcohol from Solution (A) then adding 100 ml of kerosene and allowing the result to cool overnight (5–14 hours).

Example 2

Magnesium chloride (technical, 205 g) was placed under gentle reflux in 1475 ml of n-propanol overnight. 500 ml of propanol was distilled away (at ~96.5° C.) and 50 ml of kerosene (b.p. 140°–150° C.) and 400 ml of isooctane were added. After 4 hours of stirring, the product, a solid crystalline mass, was collected on a coarse fritted glass funnel, washed with isooctane and then washed with isopentane. After washing the precipitate was dried under moving nitrogen. Yield: 745 g of transparent flaky white crystals, having 6.53% Mg.

Example 3

Magnesium ethoxide (2.9 g) was suspended in 30 g of ethanol and the mixture heated to near boiling. Aluminum ethoxide (5 mmol) was added. Most of the magnesium ethoxide appeared to dissolve after 20 minutes of stirring. An additional amount, 20 mmol, of aluminum ethoxide was added to give a milky solution. To this solution was added the crystalline product from a treatment of 5 g of magnesium chloride with 50 ml of ethanol. The cloudy solution was filtered hot and then cooled to give a precipitate composed of, largely, hexagonal crystals surrounded by a small amount of needle shaped material. The hexagonal crystals were collected by decantation, washed with isopentane and dried under moving nitrogen. Analysis: Mg 6.44%, ethanol 55.0% (Theoretical for $Mg_2AlCl_7 \cdot 9Ethanol$: Mg 6.58%, ethanol 56.15%).

Preparation of the supported magnesium particles

Example 4 (using ethyl benzoate (EB) in supporting step on untreated silica)

13 g of the n-propanol adduct of Example 2 above was heated to 130° C. to produce a molten material. Ethyl benzoate (EB) (1.3 g) was added. Next, a total of 3.3 g of silica was added over the course of ten minutes. After all of the silica had been added, the mixture was a dry free-flowing powder. The powder was slurried in 50 ml of isooctane then 20 ml of silicon tetrachloride was added drop-wise, over a 15 minute period. The mixture was then stirred at room temperature for 1 hour. After stirring, the mixture was heated at 60° C. for 60 min. The solid was collected on a coarse fritted glass funnel, washed with isooctane, then dried under moving nitrogen. Yield 8.9 g.

Example 5 (using EB in supporting step on 150° C. heat treated silica)

The procedure of Example 4 was followed except that 4.0 g of 150° C. heat treated silica was added all in one portion.

Example 6 (using EB in supporting step on 300° C. heat treated silica)

The procedure of Example 4 was followed except that 4.0 g of 300° C. heat treated silica was used.

Example 7

The procedure of Example 4 was followed except that 4.0 g of 450° C. heat treated silica was used.

Preparation of the Procatalysts

In the following examples, the procatalysts (examples 8-13) were prepared as follows: 1.3 grams of ethyl benzoate was added along with 150 ml of a 1:1 (vol:vol) mixture of titanium tetrachloride and chlorobenzene to 50 mmol of the appropriate magnesium precursor shown in column 2 of Table 1 and stirred at room temperature for up to about 15 minutes. The mixture was then stirred for up to an hour at 110° C. and filtered hot, at about 110° C.

The residual solid was slurried in 150 ml of the 1:1 titanium tetrachloride/chlorobenzene solution and about 3.4 mmol benzoyl chloride (see U.S. Pat. No. 4,535,068) The slurry was stirred for up to about an hour at 110° C., and filtered at about the same temperature. The solid was then slurried in 150 ml of a 1:1 titanium tetrachloride/chlorobenzene solution and stirred at about 110° C. for up to about 30 minutes and filtered again at about that same temperature. The reaction vessel was cooled to below 40° C. and the solid was washed 6 times with 150 ml portions of isopentane then dried for 100 minutes, at 40° C., under moving nitrogen. The titanium, magnesium and ester contents for each of the various procatalysts are shown in Tables 1 and 2. The catalysts of Examples 8 and 9 are control examples using no silica support.

For LIPP polymerizations using the above described ethyl benzoate catalysts, a one gallon autoclave with a 2.5 inch paddle stirrer and a two slat baffle was charged with 2.7 liters o: propylene and 132 mmol hydrogen then heated to 60° C. whereupon 0.35 mmol ethyl-p-ethoxy benzoate (PEEB) was injected, iollowed closely by 0.70 mmol of triethylaluminum (TEA), followed by a 5mineral oil slurry of procatalyst containing 0.01 mmol of Ti. After the initial exotherm, the reactor temperature was held at 67° C. for 1.0 hr.

Gas phase polymerizations as well as solution slurry polymerizations using the novel procatalyst and resultant catalyst system are contemplated as within the scope of the present invention.

The various catalysts prepared above are compared in Tables 1 and 2. Not all results are shown. Catalyst productivities and representative morphologies are shown. All of the silica supported catalysts produced polymer comprised of essentially spherical particles. A comparison of the particle size distribution, of the polymer formed will relate to the particle size distribution of the starting silica (Silica microspheres as provided by the manufacturer, PQ Corporation) and this Table 1 shows that the polymer morphology exactly replicates catalyst morphology both as to shape as well as size distribution.

Table 2 shows that the catalysts prepared upon supports that have been heat treated to at least 150° C. (to remove most of the adsorbed water) are of optimum productivity and selectivity.

TABLE 1

Stoichiometric Compositions of Examples 8 through 13

| Catalyst Example # | Support Example # | Ti (% w) | Mg (% w) | Ethyl Benzoate (% w) |
|---|---|---|---|---|
| 8 (no SiO$_2$) | 1 | 3.74 | 16.0 | 7.5 |
| 9 (no SiO$_2$) | 3 | 4.79 | 18.2 | |
| 10 | 4 | 4.25 | 10.6 | 4.4 |
| 11 | 5 | 2.17 | 7.8 | 2.8 |
| 12 | 6 | 3.13 | 9.4 | 3.6 |
| 13 | 7 | 2.70 | 8.7 | 4.1 |

Table 2

Productivities and Polymer Characteristics for Propylene Polymerizations Carried out Using the Catalysts of Examples 8 through 13 . (The column on initial silica treatment has been inserted in an attempt to make interexample comparisons easier.)

| Example # | Productivity (Kg PP/g Cat) | Xylene Solubles (% w) | Initial Silica Treatment | Polymer Morphology |
|---|---|---|---|---|
| 8 Compar. | 13.8 | 7.8 | no silica | fine powder, bulk density ~0.25 |
| 9 Compar. | 5.1 | 6.9 | no silica | fine powder bulk density ~0.25 |
| 10 | 5.7 | 7.3 | unheated + EB | spherical |
| 11 | 6.9 | 6.6 | 150 C + EB | spherical |
| 12 | 9.4 | 7.5 | 300 C + EB | spherical |
| 13 | 9.3 | 6.7 | 450 C + EB | |

What is claimed is:

1. A method for making crystalline magnesium halide particles having the formula $Mg_nE_mX_p \cdot yROH$, wherein E is iron, chromium, cobalt, aluminum or calcium, X is halogen, ROH is an alcohol, n is a number from 0.25 to 6, m is 0 or 1, p is a number from 2n to (am+2n), where a is the valence of the metal E, and y is a positive number of up to 12, which method comprises contacting a magnesium compound of the formula $Mg_nE_mX_p$, wherein the various symbols are as defined herein, or precursor(s) thereof, with an alcohol of the formula ROH to form a solution thereof, heating the solution to remove any water present by azeotroping, and contacting the heated solution with an inert hydrocarbon liquid to precipitate cyrstalline particles.

2. The method according to claim 1, wherein X is chlorine.

3. The method according to claim 1, wherein said alcohol is a linear aliphatic alochol.

4. The method according to claim 3, wherein said alcohol is ethanol, propanol, n-butanol or n-dodecanol.

5. A method for making supported particles which comprises melting crystalline magnesium halide particles prepared in accordance with the method claimed in claim 1 at a temperature of 80° C. to 200° C., and adding a porous support to the molten product to form supported magnesium halide particles.

6. The method according to claim 5, wherein the crystalline particles are melted at 100 °C. to 150 °C.

7. The method according to claim 5, wherein said porous support comprises essentially anhydrous silica particles having a pore volume of 1.4 to 3 ml/g.

8. The method according to claim 7, wherein the silica particles have been dried by heating in a stream of dry inert gas at 150 °C. to 450 °C.

9. The method according to claim 8, wherein the silica has been heated at 150° C. to 300° C.

10. A method for making a procatalyst component which comprises halogenating supported particles prepared in accordance with the method claimed in claim 5 using a first halide of tetravalent titanium and a first electron donor to form a halogenated product, contacting the halogenated product with a second halide of tetravalent titanium and a second electron donor to form a treated halogenated product, contacting the treated halogenated product with a third halide of tetravalent titanium and additional second electron donor at a temperature from 40° C. to 140° C., and washing the resulting treated product with an inert hydrojcarbon liquid.

11. The method according to claim 10, wherein said first electron donor is isobutyl phthalate and the second electron donor is ethyl benzoate.

12. The method according to claim 10 wherein said halogenated product is produced in the presence of a halogenated hydrocarbon.

13. The method according to claim 12, wherein said halogenated hydrocarbon is chlorobenzene.

14. The method according to claim 10, wherein the amount of the first electron donor is between 10 and 15 wt% of the halogenated product.

15. The method according to claim 10, wherein at least two different compounds are used as the first, second, and third halides of tetravlent titanium.

16. The method according to claim 10, wherein titanium tetrachloride is used as at least one of the first, second, and third halides of tetravalent titanium.

17. A method for preparing a catalyst system comprising contacting a procatalyst prepared in accordance with the method claimed in claim 10 with a cocatalyst comprising an organoaluminum compound in molar ratios which produce an atomic ratio of Al to Ti of from 1/1 to 150/1.

* * * * *